United States Patent
Ziech et al.

(10) Patent No.: US 6,866,277 B2
(45) Date of Patent: Mar. 15, 2005

(54) FRONT SUSPENSION

(75) Inventors: James F. Ziech, Kalamazoo, MI (US); Michael L. Zebolsky, Marshall, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/174,928

(22) Filed: Jun. 20, 2002

(65) Prior Publication Data

US 2003/0234529 A1 Dec. 25, 2003

(51) Int. Cl.[7] .......................... B60G 9/02; B60G 15/00; B60G 15/12
(52) U.S. Cl. .................. 280/124.116; 280/124.145; 280/124.147; 280/124.148; 280/124.154; 280/124.155
(58) Field of Search .................. 280/124.116, 124.11, 280/124.128, 124.145, 124.147, 124.148, 124.154, 124.155

(56) References Cited

U.S. PATENT DOCUMENTS

| | | | | |
|---|---|---|---|---|
| 2,304,291 A | | 12/1942 | Wahlberg | ............. 280/124.127 |
| 3,042,422 A | | 7/1962 | Garnett | .................. 280/124.21 |
| 4,168,086 A | | 9/1979 | Dick et al. | ................ 280/124.1 |
| 4,377,298 A | * | 3/1983 | Finn et al. | ............ 280/124.145 |
| 4,613,152 A | * | 9/1986 | Booher | ................ 280/124.145 |
| 4,662,467 A | * | 5/1987 | Arai et al. | ............ 280/124.116 |
| 4,699,530 A | * | 10/1987 | Satoh et al. | .......... 280/124.155 |
| 4,826,204 A | * | 5/1989 | Cameron | ............. 280/124.154 |
| 4,887,844 A | * | 12/1989 | Enokimoto et al. | ... 280/124.128 |
| 5,161,813 A | * | 11/1992 | Yamashita et al. | ..... 280/124.145 |
| 5,308,104 A | * | 5/1994 | Charles | ................ 280/124.155 |
| 5,445,404 A | * | 8/1995 | Shida et al. | .......... 280/124.116 |
| 5,597,172 A | | 1/1997 | Maiwald et al. | ....... 280/124.153 |
| 6,017,044 A | * | 1/2000 | Kawagoe | ............. 280/124.145 |
| 6,062,580 A | * | 5/2000 | Kawabe et al. | ........ 280/124.145 |
| 6,126,198 A | * | 10/2000 | Handke et al. | ........ 280/124.145 |
| 6,155,544 A | * | 12/2000 | Solomond et al. | .... 280/124.155 |
| 6,244,607 B1 | * | 6/2001 | Nishino | ............... 280/124.147 |

FOREIGN PATENT DOCUMENTS

| | | |
|---|---|---|
| DE | 10 90 979 B | 10/1960 |
| DE | 31 44 431 C | 3/1988 |
| EP | 0 940 325 A | 9/1999 |

* cited by examiner

*Primary Examiner*—Darren W. Ark
(74) *Attorney, Agent, or Firm*—Dykema Gossett PLLC

(57) ABSTRACT

A suspension for coupling a steer axle assembly to a vehicle frame is provided that moves one or more of the spring reaction points outboard to increase roll stiffness and enable the use of a lighter axle. In one embodiment of the invention, the suspension includes a spring coupled to the vehicle frame and a shock absorber having a first end coupled to the spring and a second end coupled to a component of the steer axle assembly, such as the kingpin, at a location outboard of a longitudinal frame rail of the vehicle frame.

10 Claims, 5 Drawing Sheets

FRONT SUSPENSION

BACKGROUND OF THE INVENTION

1. Field of the Invention

This invention relates to vehicle suspensions and, in particular, to a front suspension for coupling a steer axle assembly to a vehicle frame.

2. Discussion of Related Art

A conventional vehicle includes a vehicle frame having a pair of longitudinally extending frame rails that support the vehicle engine and body. The frame is supported on a plurality of ground-engaging wheels that are disposed at opposite ends of a plurality of axles. The vehicle may contain, for example, a steer axle on which the wheels are steerable by the vehicle operator and a drive axle whose wheels are driven by the vehicle engine. Each of the axles are coupled to the vehicle frame through a suspension that dampens movements transmitted between the wheels and the vehicle frame.

A conventional front suspension for a steer axle includes a spring disposed on each side of the vehicle. The springs extends vertically between the vehicle frame and spring seats formed on the axle (e.g., by a plate welded or bolted to the axle beam). The springs abuts the frame and the axle beam at a lateral spacing approximately equal to the spacing between the longitudinal frame rails of the vehicle frame. This conventional suspension suffers from a significant drawback. In particular, the narrow spacing between the springs limits the roll stiffness that can be imparted by the suspension. Further, the narrow spacing induces a high vertical bending moment into the axle beam. As a result, the vehicle requires a relatively heavy and expensive axle beam to absorb the load.

The inventors herein have recognized a need for a suspension for coupling a steer axle assembly to a vehicle frame that will minimize and/or eliminate one or more of the above-identified deficiencies.

SUMMARY OF THE INVENTION

The present invention provides a suspension for coupling a steer axle assembly to a vehicle frame having first and second longitudinal frame rails.

A suspension in accordance with one embodiment of the present invention includes a spring coupled to the vehicle frame. The suspension further includes a shock absorber having a first end coupled to the spring. A second end of the shock absorber is coupled to the steer axle assembly at a location outboard of the vehicle frame rail. The second end of the shock absorber may, for example, be coupled to the kingpin or knuckle or the axle beam of the steer axle assembly. The spring may also be disposed outboard of the vehicle frame rail.

A suspension in accordance with another embodiment of the present invention again includes a spring coupled to the vehicle frame. The suspension further includes a suspension control arm forming a spring seat for the spring. The suspension control arm has an inboard end coupled to the frame and an outboard end coupled to the steer axle assembly at a location outboard of the vehicle frame rail.

A suspension in accordance with the present invention is advantageous. The suspension moves one or more of the spring/shock absorber application and reaction points outboard of the vehicle frame rails with the application points proximate the wheels of the vehicle. As a result, the inventive suspension increases roll stiffness of the vehicle. Further, the inventive suspension reduces the bending moment induced on the axle beam allowing the use of a lighter and less expensive axle beam.

These and other advantages of this invention will become apparent to one skilled in the art from the following detailed description and the accompanying drawings illustrating features of this invention by way of example.

DETAILED DESCRIPTION OF EMBODIMENTS OF THE INVENTION

Figure 1:
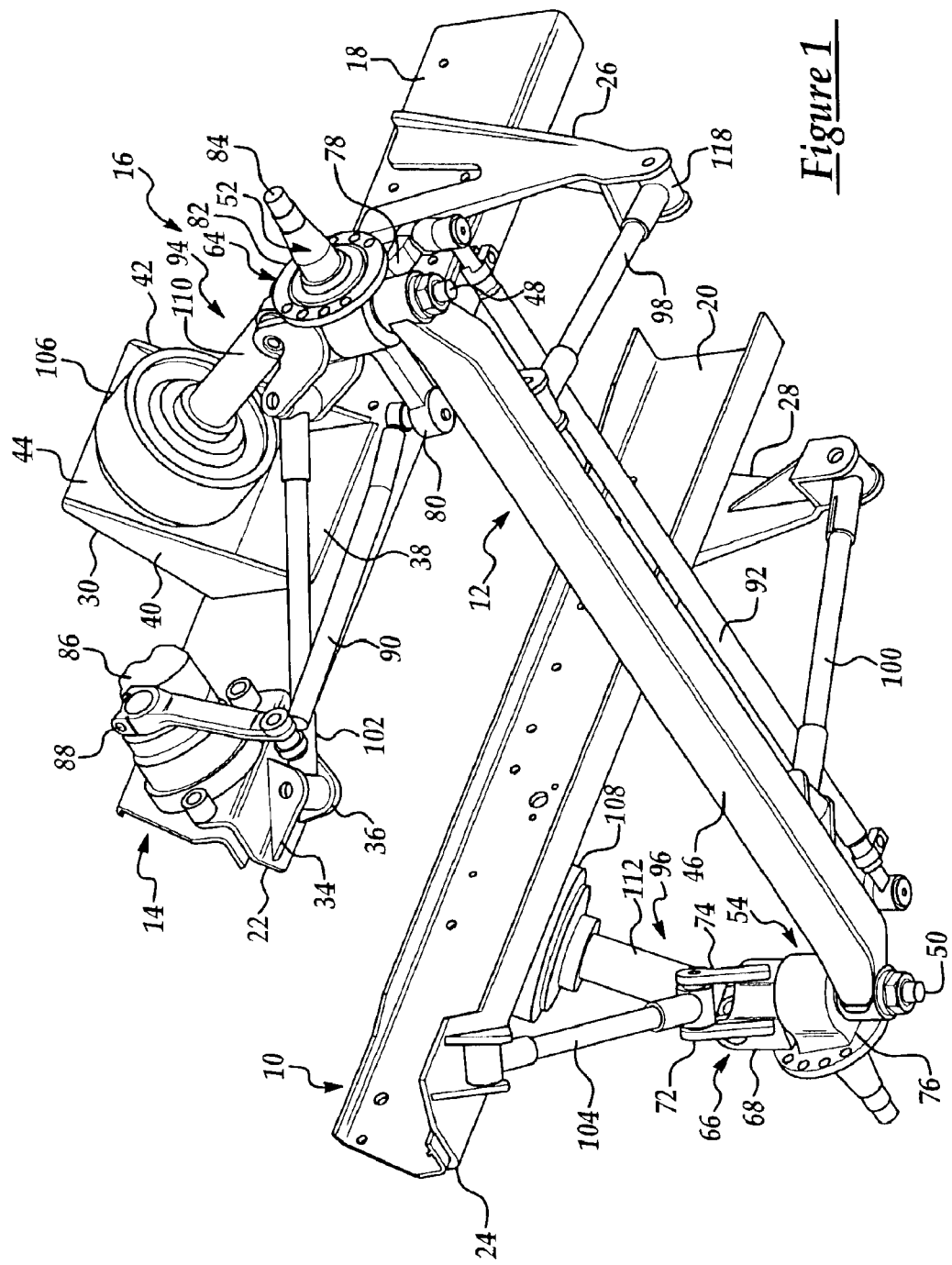
FIGS. 1 and 2 are perspective views illustrating a portion of a vehicle incorporating a suspension in accordance with one embodiment of the present invention for coupling a steer axle assembly to a frame of the vehicle.
Figure 2:
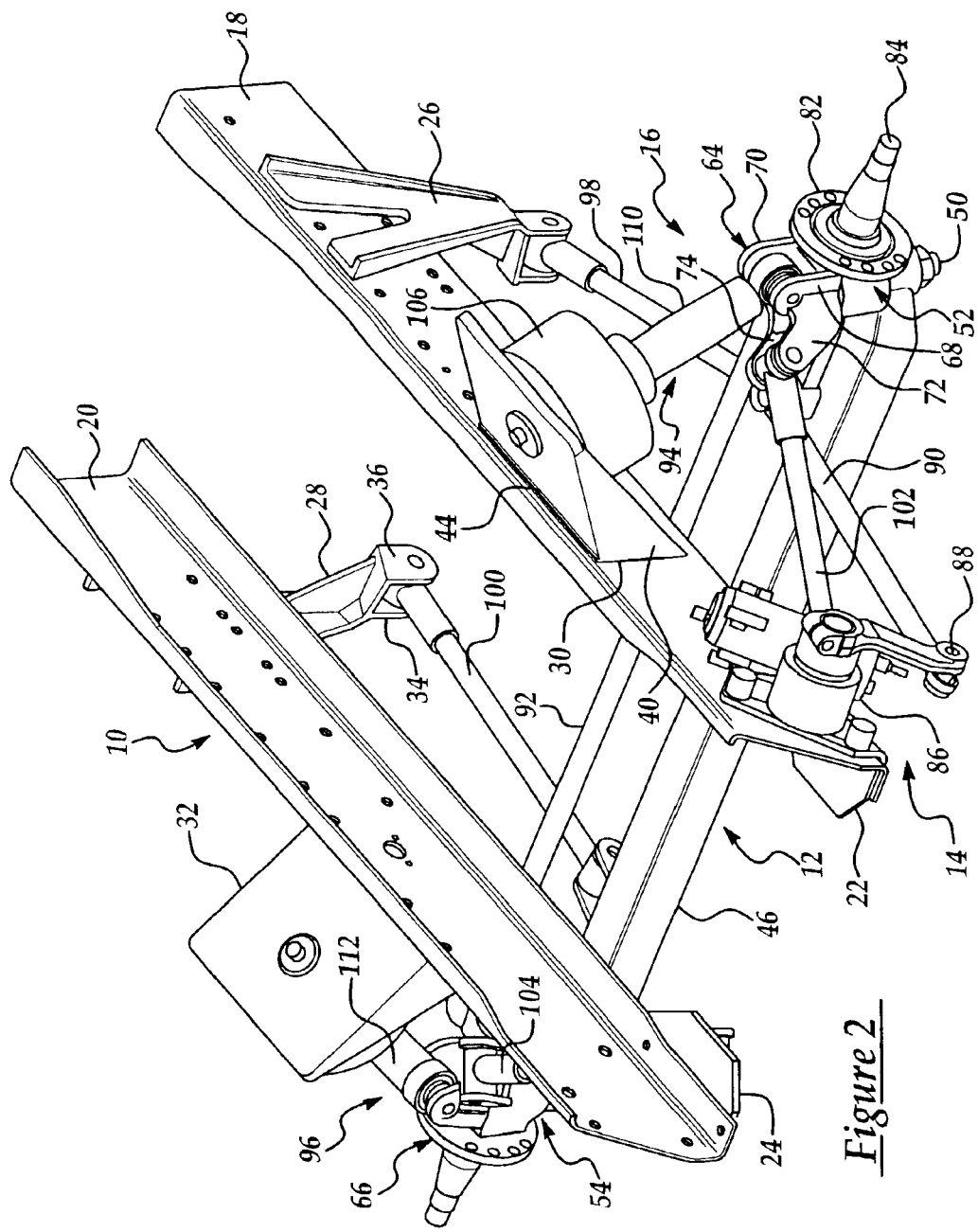

Referring now to the drawings wherein like reference numerals are used to identify identical components in the various views, FIGS. 1 and 2 illustrate a vehicle frame 10 having a steer axle assembly 12 coupled thereto by a steering assembly 14 and a suspension 16 in accordance with the present invention. In the illustrated embodiment, frame 10 and steer axle assembly 12 are adapted for use with a heavy truck. It should be understood, however, that the present invention may find application on a wide variety of vehicles.

Frame 10 is provided to support an engine (not shown), cab (not shown) and other components of a heavy truck. Frame 10 is conventional in the art and may be made from conventional metals and metal alloys such as steel. Frame 10 includes a pair of longitudinal rails 18, 20 extending in the direction of vehicle travel and in the longitudinal direction of the truck. Frame 10 may also include a plurality of cross-members (not shown) extending transversely between rails 18, 20 and a plurality of mounting brackets including brackets 22, 24, 26, 28, 30, 32.

Rails 18, 20 are provided to secure and align a cab on frame 10 and are conventional in the art. Rails 18, 20 are generally C-shaped in cross-section and open toward one another. Rails 18, 20 may include a plurality of apertures configured to receive bolts, screws, or other fasteners used to secure mounting brackets 22, 24, 26, 28, 30, 32.

Mounting brackets 22, 24, 26, 28, 30, 32 are provided to couple components of steering assembly 14 and suspension 16 to frame 10. Brackets 22, 26, 30 and 24, 28, 32 are connected to rails 18, 20, respectively. Brackets 22, 24, 26, 28 each define a pair of downwardly extending spaced ears 34, 36 having aligned apertures with brackets 26, 28 extending further downward from rails 18, 20 than brackets 22, 24. Brackets 30, 32 are disposed between brackets 22, 26 and 24, 28, respectively. Each of brackets 30, 32 includes a side wall 38, forward and rear walls 40, 42, and a top wall 44 that together define a cavity. Wall 38 of each bracket 30, 32 is coupled to an outboard side of a corresponding rail 18, 20. Walls 40, 42, 44 of each bracket 30, 32 extend away from rails 18, 20, respectively, in an outboard direction with top wall 44 of each bracket 30, 32 extending upward from the rail 18, 20 at an angle to the longitudinal axis of the rail. 18, 20 It should be understood that the size, shape, and configuration of brackets 22, 24, 26, 28, 30, 32 will vary depending upon design requirements and parameters associated with frame 10, steer axle assembly 12, steering assembly 14, and suspension 16 and that variations may be made to brackets 22, 24, 26, 28, 30, 32 without departing from the scope of the present invention.

Steer axle assembly 12 supports one or more steerable wheels (not shown) disposed on either side of the vehicle. Assembly 12 may include an axle beam 46, kingpins 48, 50, steering knuckles 52, 54, and thrust washers 56, 58 (best shown in FIG. 3).

Axle beam 46 supports wheels (not shown) disposed proximate either end of beam 46. Beam 46 may be made from conventional metals and metal alloys such as steel and may be forged or fabricated. Beam 46 extends transverse to rails 18, 20 and each end of beam 46 defines a bore that extends generally vertically and substantially perpendicular to the longitudinal axis of beam 46. Each bore is configured to receive a corresponding kingpin 48, 50.

Figure 3:
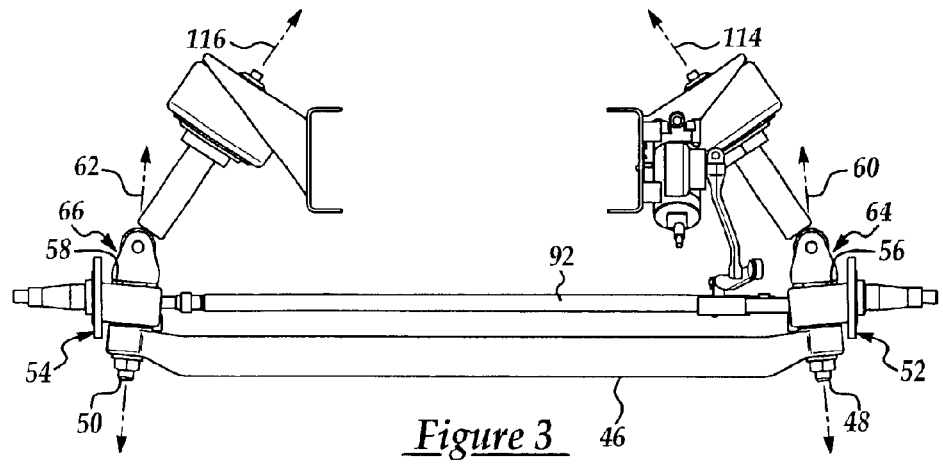
FIG. 3 is a front view of the suspension of FIGS. 1 and 2.

Kingpins 48, 50 are provided to couple knuckles 52, 54 to beam 46. Kingpins 48, 50 may be made from steel or other conventional metals and metal alloys. Each kingpin 48, 50 may be fixed against rotation within a corresponding bore of axle beam 46 using one or more drawkeys as is conventional in the art. Kingpins 48, 50 are generally circular and are disposed about longitudinal axes 60, 62 as shown in FIG. 3. Referring again to FIGS. 1 and 2, one end of each kingpin 48, 50 may define a mounting bracket 64, 66 configured to receive components of suspension 16. In the illustrated embodiment, each mounting bracket 64, 66 defines two pairs of upwardly extending spaced ears, 68, 70 and 72, 74 respectively, having aligned apertures. It should be understood that the size, shape, and configuration of mounting brackets 64, 66 may vary depending upon design requirements and parameters associated with suspension 16. It should also be understood that, although mounting brackets 64, 66 are shown as an integral part of kingpins 48, 50, mounting brackets 64, 66 may comprise separate components coupled to the circular body of kingpins 48, 50.

Knuckles 52, 54 are provided for mounting one or more wheels (not shown) of the vehicle and for connecting assembly 12 and steering assembly 14. Knuckles 52, 54 may be made from conventional metals such as aluminum and metal alloys such as steel and may be forged or fabricated. Each knuckle 52, 54 may include a body 76 that defines a bore sized to receive a corresponding kingpin 48, 50 and bearings or a bushing surrounding the kingpin 48, 50 to allow the knuckles 52, 54 to rotate relative to kingpins 48, 50. Each knuckle 52, 54 includes a tie rod arm 78 and knuckle 52 further includes a steering arm 80 as is conventional in the art. Each knuckle 52, 54 may also include a brake mounting plate 82 and a spindle 84 (which may be integral with knuckle body 76 or coupled thereto) on which wheel bearings (not shown) and one or more wheels (not shown) are mounted.

Thrust washers 56, 58 are provided to absorb pressures along the kingpin axes 60, 62. Referring to FIG. 3, washers 56, 58 are disposed about kingpins 48, 50 proximate one end of kingpins 48, 50 between mounting brackets 64, 66 and the body 76 of knuckles 52, 54. In this manner, thrust loads are transferred through knuckles 52, 54 to beam 46.

Figure 4:
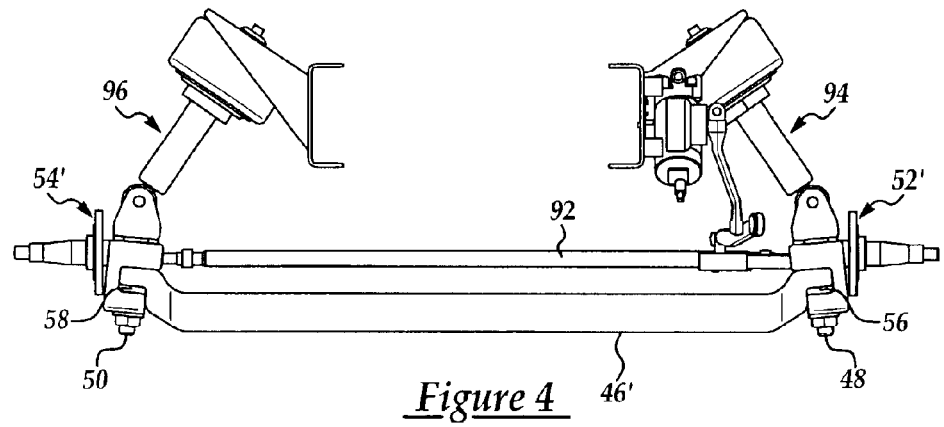
FIG. 4 is a front view illustrating the suspension of FIGS. 1–3 used to couple a different steer axle assembly to the vehicle frame.

It should be understood that the steer axle assembly 12 described and illustrated in FIGS. 1–3 is exemplary only. The inventive suspension 16 claimed herein may find use on a wide variety of steering assemblies. In the steering assembly 12 of FIGS. 1–3, axle beam 46 is a relatively straight and light weight axle beam that realizes one of the advantages of the present invention. Further, body 72 of each knuckle 52, 54 is a unitary sleeve defining a single knuckle boss as described in greater detail in commonly assigned U.S. patent application Ser. No. 09/633,383, the entire disclosure of which is incorporated herein by reference. Referring to FIG. 4, however, the inventive suspension 46 is shown in use with another steer axle assembly 12'. In FIG. 4, the axle beam 46' comprises a conventional gooseneck, I-beam and knuckles 52', 54' comprise conventional two-boss yokes defining coaxial spaced bores configured to receive kingpins 48, 50. Thrust bearings 56', 58' are disposed kingpins 48, 50 between beam 46' and knuckles 52', 54'. In this manner thrust loads are transferred through kingpins 48, 50 to beam 46' and then to steering knuckles 52', 54'.

Referring again to FIGS. 1–3, steering assembly 14 is provided to enable the vehicle operator to turn the wheels (not shown) supported on knuckles 52, 54. Steering assembly 14 is conventional in the art and includes a steering gear 86 coupled to bracket 22, a crank 88 coupled to steering gear 86, a drag-link 90 extending between crank 88 and steering arm 80 of knuckle 52 and a tie rod 92 extending between tie-rod arms 78 of knuckles 52. Crank 88 rotates responsive to an output shaft extending from steering gear 86 and causes corresponding movement, in link 90, steering knuckle 52, tie-rod 92, and knuckle 52.

Suspension 16 couples steer axle assembly 14 to frame 10. Suspension 16 may include spring/shock absorber units 94, 96, and suspension control arms 98, 100, 102, 104.

Spring/shock absorber units 94, 96 are provided to dampen movements between steer axle assembly 14 and frame 10. Units 94, 96 are conventional in the art and each unit may include an air spring 106, 108 and a shock absorber 110, 112, respectively.

Springs 106, 108 are coupled to frame 10. In particular, springs 106, 108 are disposed against a spring seat formed by top walls 44 of brackets 30, 32 and, therefore, have reaction points that are located outboard of frame rails 18, 20 to increase roll stiffness. Referring to FIG. 3, springs 106, 108 are disposed about axes 114, 116 that extend at an angle (i.e. are not parallel) relative to the longitudinal axes 60, 62 of kingpins 48, 50. Springs 106, 108 exert a force on frame 10 in an axial direction. Although springs 106, 108 comprise air springs in the illustrated embodiment, it should be understood that springs 106, 108 may alternatively comprise mechanical springs.

Figure 5:
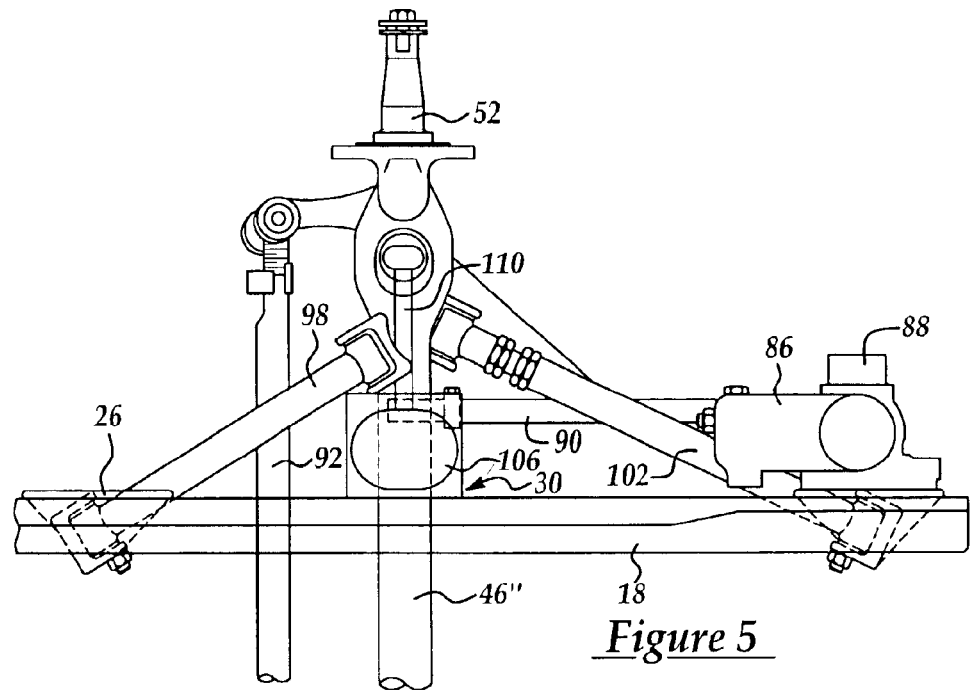
FIG. 5 is a top plan view illustrating a portion of a vehicle incorporating a suspension in accordance with another embodiment of the present invention.
Figure 7:
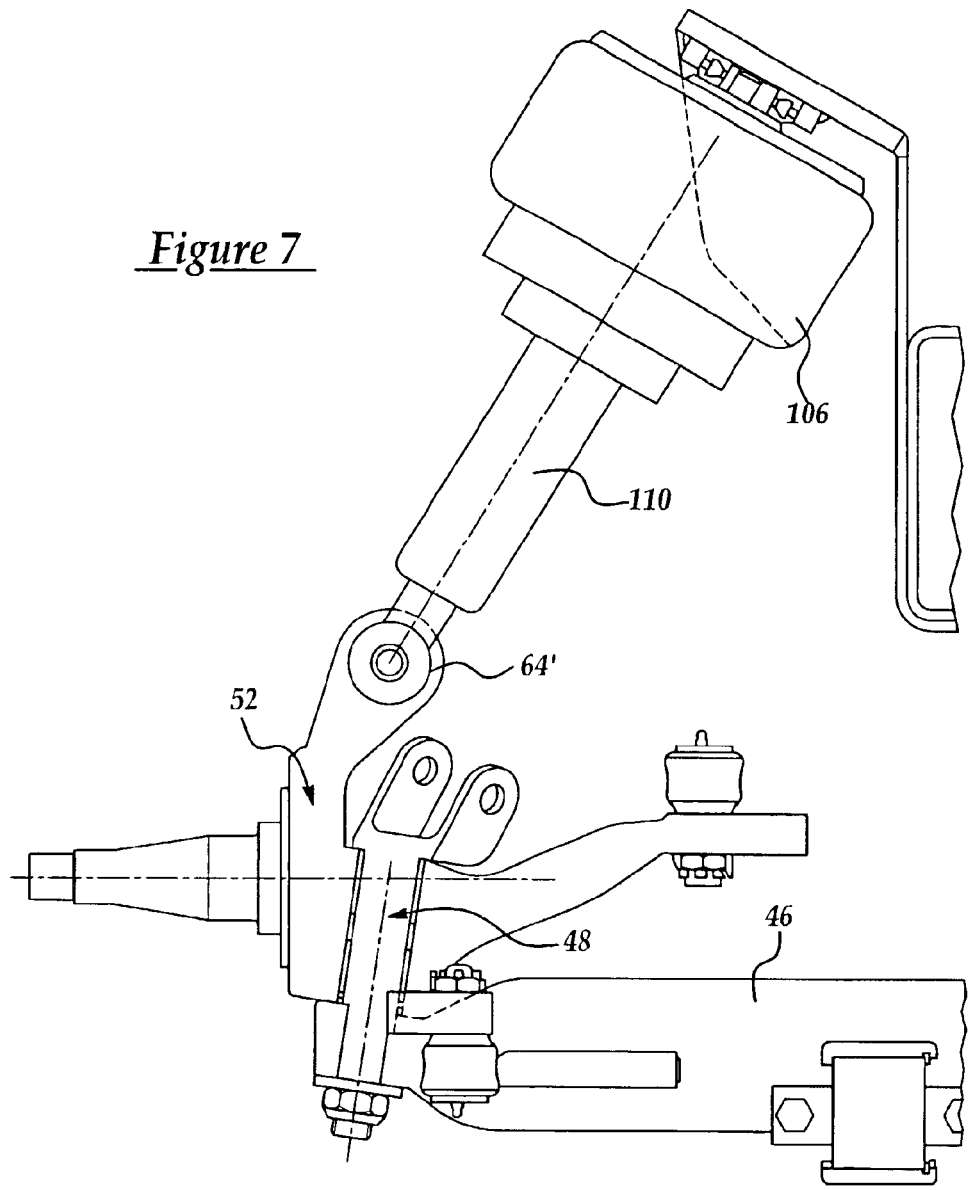
FIG. 7 is a rear and partial cross-sectional view illustrating a portion of a vehicle incorporating a suspension in accordance with another embodiment of the present invention.

Shock absorbers 110, 112 are coupled at a first end to corresponding springs 106, 108 and extend into the bladders of springs 106, 108. The shock absorbers 110, 112 may comprise dashpot shock absorbers as shown in Figures. Shock absorbers 110, 112 are coupled at a second, opposite end to kingpins 48, 50. In particular, an eye of each shock absorber 110, 112 receives a bushing or bearing through which a fastener such as a pin extends. The fasteners are received in corresponding apertures in ears 68, 70 of each mounting bracket 64, 66 and are held therein in a conventional manner. Referring to FIG. 5, in another embodiment of the invention, one end of each shock absorber 110, 112 is coupled directly to an axle beam 46". Axle beam 46" may define spring seats configured to receive shock absorbers 110, 112 using a mounting arrangement similar to mounting brackets 64, 66 of kingpins 48, 50. Referring to FIG. 7, in another embodiment of the invention, one end of each shock absorber 110, 112 is coupled directly to a corresponding steering knuckle 52, 54. Knuckles 52, 54 may define mounting brackets 64' (only one of which is shown in the illustrated embodiment) similar to mounting brackets 64, 66 of kingpins 48, 50. In each instance, shock absorbers 110, 112 are coupled to steer axle assembly 12 at a location outboard of frame rails 18, 20 and have application points located proximate the vehicle wheel at a location on the kingpins 48, 50, knuckles 52, 54, or axle beam 46". In this manner, the spring application points are moved outboard thereby reducing the induced bending moment in beam 46.

Referring to FIGS. 1 and 2, suspension control arms 98, 100, 102, 104 further dampen movement between steer axle assembly 14 and frame 10 and are conventional in the art. Each arm 98, 100, 102, 104 includes a bushing 118 disposed at each end through which a fastener such as a pin may extend to couple the arm 98, 100, 102, 104 to another component of frame 10 or steer axle assembly 12. Arms 98, 100 are coupled at a first end to brackets 26, 28 and a second end to axle beam 46 using conventional mounting brackets affixed to axle beam 46. Arms 102, 104 are coupled at a first end to brackets 22, 24. In one embodiment of the invention, arms 102, 104 are coupled at a second end to kingpins 48, 50, respectively. In particular, the bushings 118 at the end of arms 102, 104 are disposed between ears 72, 74 of each mounting bracket 64, 66 and a fastener extends through corresponding apertures in ears 72, 74 and through the corresponding bushings 118 of arms 102, 104. Referring to FIG. 5, in an alternative embodiment of the invention, the second end of each arm 102, 104 may be coupled to axle beam 46" or even to steering knuckles 52, 54. It should be understood that FIGS. 1–2 and 5 illustrate aspects of the invention that could be used in various combinations. For example, one end of each shock absorber 110, 112 may be coupled to a respective kingpin 48, 50 or steering knuckle as illustrated in FIGS. 1 and 2 while one end of each control arm 102, 104 may be coupled to axle beam 46" as illustrated in FIG. 5. Similarly, one end of each shock absorber 110, 112 may be coupled to axle beam 46" as illustrated in FIG. 5 while one end of each control arm 102, 104 is coupled to a corresponding kingpin 48, 50 or steering knuckle 52, 54 as illustrated in FIGS. 1 and 2.

Figure 6:
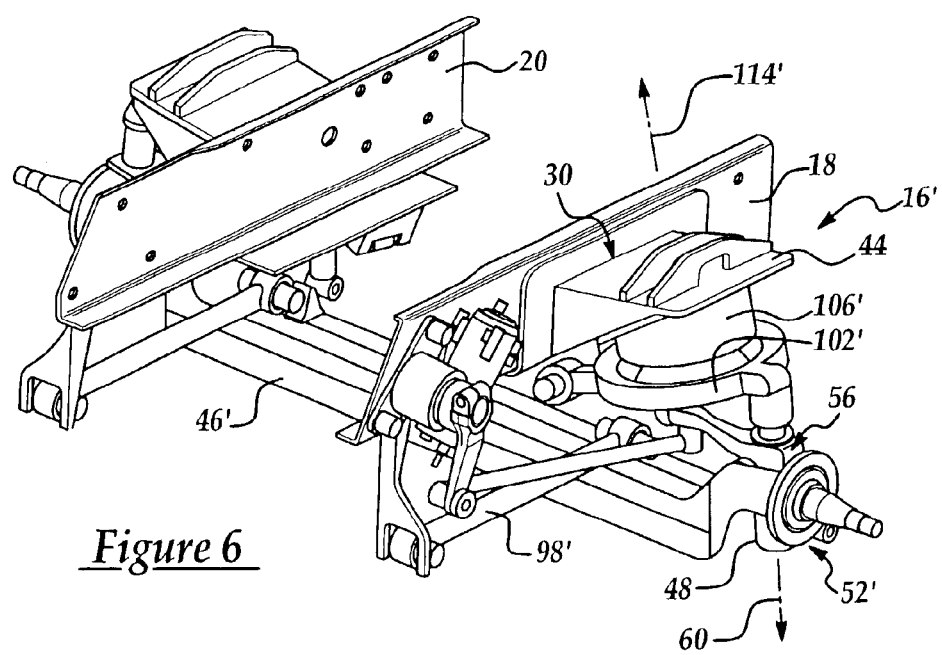
FIG. 6 is a front view illustrating a portion of a vehicle incorporating a suspension in accordance with another embodiment of the present invention.

Referring to FIG. 6, another embodiment of a suspension 16' in accordance with the present invention will be illustrated. Suspension 16' includes springs 106' (only one of which is shown) disposed on opposite sides of the vehicle and upper and lower suspension control arms 98', 102' (only one of each of which is shown) also disposed on opposite sides of the vehicle.

Springs 106' are again coupled to frame 10. In particular, springs 106' are disposed against a spring seat formed by top walls 44 of brackets 30, 32 and are, therefore, located outboard of frame rails 18, 20. Springs 106' are disposed about axes 114' that extend at an angle (i.e. are not parallel) relative to the longitudinal axes 60, 62 of kingpins 48, 50. Springs 106' exert a force on frame 10 in an axial direction. Although springs 106' comprise air springs in the illustrated embodiment, it should again be understood that springs 106' may alternatively comprise mechanical springs.

Upper control arms 102' are coupled at inboard ends to frame 10. In particular, the inboard ends of arms 102' may be coupled to mounting brackets (not shown) attached to frame rails 18, 20. Upper control arms 102' are coupled at their outboard ends to kingpins 48, 50 or steering knuckles 52, 54. Arms 102' form spring seats for springs 106'. Lower control arms 98' are coupled at their inboard ends to brackets 22, 24 of frame rails 18, 20 and are coupled at their outboard ends to axle beam 46 as in the embodiment illustrated in FIGS. 1–3.

A suspension in accordance with the present invention represents a significant improvement as compared to conventional suspensions. The inventive suspension moves one or more of the spring/shock absorber application points outboard of the vehicle frame rails and onto a portion of the steer axle assembly proximate the vehicle wheels. As a result, the inventive suspension reduces the bending moment induced on the axle beam thereby allowing the use of a lighter and less expensive axle beam. Further, the inventive suspension may also move one or more of the spring/shock absorber reaction points outboard of the vehicle frame rails to increase roll stiffness.

While the invention has been shown and described with reference to one or more particular embodiments thereof, it will be understood by those of skill in the art that various changes and modifications can be made without departing from the spirit and scope of the invention.

We claim:

1. A suspension for coupling a steer axle assembly to a vehicle frame having first and second longitudinal frame rails, comprising:
    a spring coupled to said frame;
    a dashpot shock absorber having a first end extending into said spring and a second end coupled to said steer axle assembly at a location outboard of said first frame rail; and,
    first and second suspension control arms, each of said first and second suspension control arms having a first end coupled to said frame and a second end coupled to said steer axle assembly at a location outboard of said first frame rail
    wherein said second end of said first control arm is coupled to a kingpin of said steer axle assembly and said second end of said second control arm is coupled to an axle beam of said steer axle assembly.

2. The suspension of claim 1 wherein said spring is coupled to said frame at a location outboard of said first frame rail.

3. The suspension of claim 1 wherein said spring comprises an air spring and said first end of said dashpot shock absorber extends into a bladder of said air spring.

4. A steer axle and suspension assembly for a vehicle having a frame including first and second longitudinal frame rails, comprising:
    a steer axle assembly including
        an axle beam extending transversely to said first and second frame rails, said axle beam defining a bore at one end;
        a kingpin disposed within said bore; and,
        a steering knuckle supported on said kingpin; and,
    a suspension including
        a spring coupled to said frame; and,
        a dashpot shock absorber having a first end extending into said spring and a second end coupled to said steer axle assembly at a location outboard of said first frame rail
    wherein said second end of said dashpot shock absorber is coupled to a first end of said kingpin and further comprising a thrust bearing disposed about said kingpin proximate said first end of said kingpin.

5. The steer axle and suspension assembly of claim 4 wherein said spring is coupled to said frame at a location outboard of said first frame rail.

6. The steer axle and suspension assembly of claim 4 wherein said spring comprises an air spring and said first end of said dashpot shock absorber extends into a bladder of said air spring.

7. A steer axle and suspension assembly for a vehicle having a frame including first and second longitudinal frame rails, comprising:

a steer axle assembly including
an axle beam extending transversely to said first and second frame rails, said axle beam defining a bore at one end;
a kingpin disposed within said bore; and,
a steering knuckle supported on said kingpin; and, a suspension including
a spring coupled to said frame;
a dashpot shock absorber having a first end extending into said spring and a second end coupled to said steer axle assembly at a location outboard of said first frame rail; and,
first and second suspension control arms, each of said first and second suspension control arms having a first end coupled to said frame and a second end coupled to said steer axle assembly at a location outboard of said first frame rail.

8. The steer axle and suspension assembly of claim 7 wherein said second end of said first control arm is coupled to a kingpin of said steer axle assembly and said second end of said second control arm is coupled to said axle beam of said steer axle assembly.

9. The steer axle and suspension assembly of claim 7 wherein said spring is coupled to said frame at a location outboard of said first frame rail.

10. The steer axle and suspension assembly of claim 7 wherein said spring comprises an air spring and said first end of said dashpot shock absorber extends into a bladder of said air spring.

* * * * *